Sept. 21, 1954     E. PETER     2,689,691
FISHING REEL
Filed Nov. 2, 1951
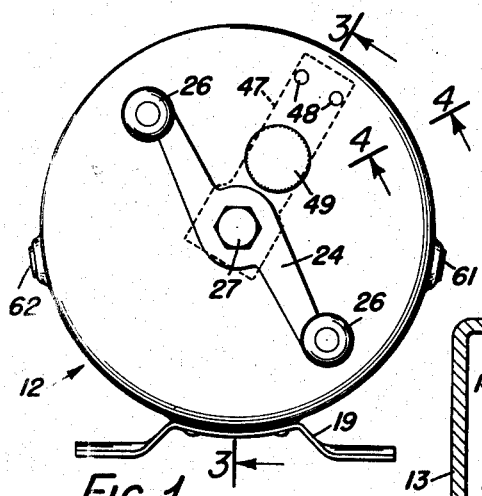
FIG. 1.
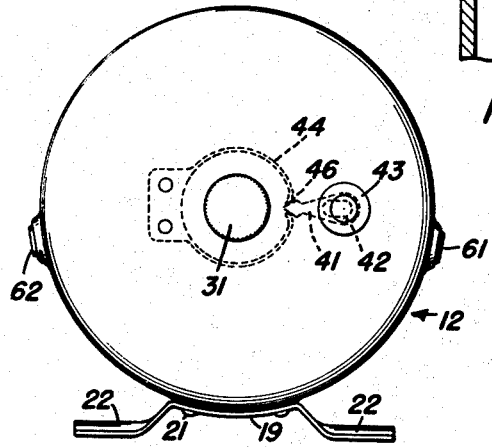
FIG. 2.
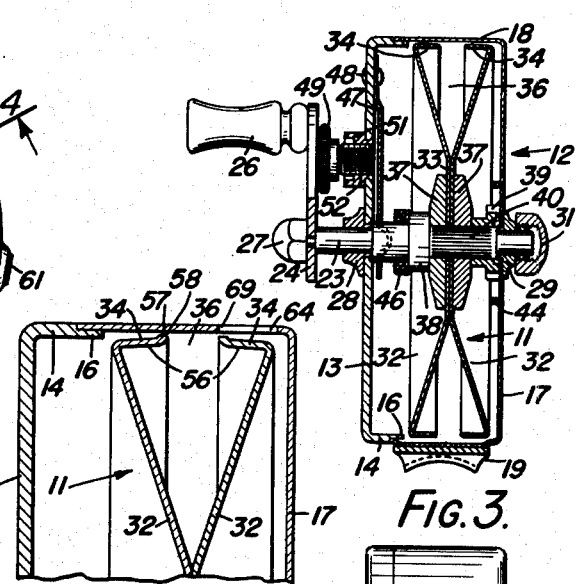
FIG. 3.
FIG. 4.
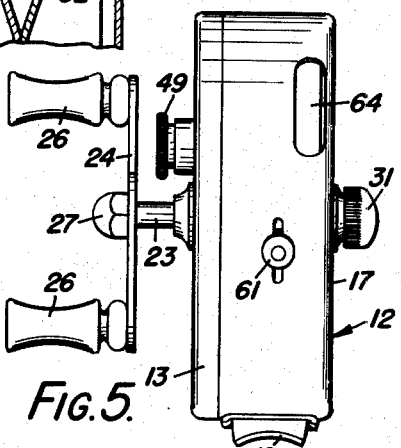
FIG. 5.
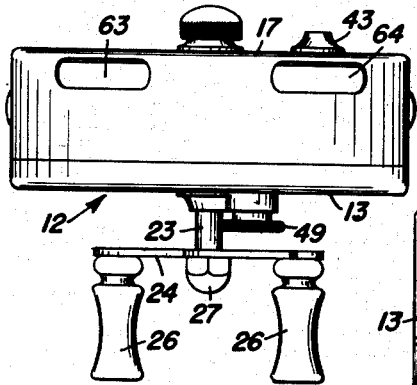
FIG. 6.
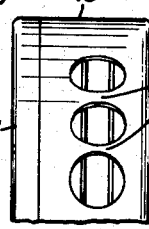
FIG. 8.
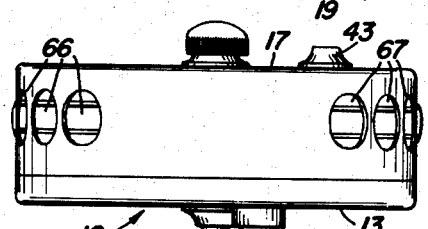
FIG. 7.
INVENTOR.
ELMER PETER
BY
*Kinslow Thomas*
ATTORNEY Patented Sept. 21, 1954

2,689,691

UNITED STATES PATENT OFFICE 2,689,691

FISHING REEL

Elmer Peter, Rochester, N. Y.

Application November 2, 1951, Serial No. 254,518

2 Claims. (Cl. 242—84.5)

An object of my invention is to provide a fishing reel of simple, durable construction which is inexpensive to manufacture.

A further object of my invention is to provide a fishing reel in which the spool or rotary drum thereof is substantially completely enclosed in a housing or casing so constructed and arranged and related to the spool that the possibility of the line being caught between the rotary spool and the stationary housing is avoided.

Another object of my invention is to provide a fishing reel adapted for use by either a right or left-handed person.

Another object of my invention is to provide a fishing reel in which the spool is adapted to accommodate the usual length of line but the space which the line may occupy decreases toward the axis of the spool.

My invention further contemplates a fishing reel adapted for right-hand or left-hand use in which the spool or drum comprises a pair of disks having peripheral flanges which extend toward each other, the spool or drum being provided with a housing which completely encloses the spool except for such openings as are required to accommodate the line and permit thumbing of the spool, the housing and spool being so constructed and arranged with respect to each other that the line cannot become caught between the rotary spool and the stationary housing when the line is payed out or reeled in.

Other objects and advantages of my invention will be set forth in the claims and will be apparent from the following description, when taken in connection with the accompanying drawings, in which:

Fig. 1 is a side elevation of the fishing reel of my invention showing the spool winding side thereof;

Fig. 2 is a side elevation of the side opposite to that shown in Fig. 1;

Fig. 3 is a sectional view taken substantially on the line 3—3 of Fig. 1;

Fig. 4 is an enlarged view of a portion of Fig. 3 but taken substantially on the line 4—4 of Fig. 1;

Fig. 5 is an end elevation of Fig. 1;

Fig. 6 is a top plan view of Fig. 1;

Fig. 7 is a view showing a slightly modified form of my invention; and

Fig. 8 is a more detailed view of a portion of Fig. 7.

The fishing reel of my invention comprises a reel spool or drum, generally indicated by the numeral 11. The spool upon which the line (not shown) is wound is substantially totally enclosed by a housing generally indicated by the numeral 12.

The housing 12 is generally cylindrical in shape and comprises a main housing part 13 having a flanged section 14. The flanged section 14 has an annular part 16 of reduced diameter. The housing includes a relatively thin wall cover part 17 which has an annular flange 18 which frictionally fits over the annular part 16 of the main housing section 13. If desired, small screws may be employed between the housing sections 13 and 17 more securely to hold the parts together.

The flange 18 of the cover part 17 has a pedestal 19 riveted thereto as indicated at 21. The pedestal 19 has a pair of arms 22 extending therefrom which are annular in cross section. As is well known in the art, a pair of rings are slidable along the fishing rod (not shown) over the arms 22 to hold the reel in assembled relation with respect to the rod.

The sections 13 and 17 of the housing 12 each has an axial opening through which a shaft 23 extends. The outboard end of the shaft 23 is provided with a double ended crank 24, each end of which is provided with a hand piece 26. A nut 27 threaded on the end of the shaft 23 holds the crank 24 in position. In the conventional manner by means of the crank and hand pieces 26, the shaft 23 is rotated to rotate the spool or drum 11 and thereby reel in the line.

Mounted and locked in the margins of the openings in the housing sections 13 and 17 are bearings 28 and 29 for rotatably supporting the shaft 23. The bearing 29 is threaded on its upper end for the reception of a nut 31 to hold the parts in assembled relation and seal the end of the shaft.

The spool or drum 11 comprises a pair of disks 32 which have flat central portions 33 which are contiguous to each other when the parts are assembled. From the central portions 33 the disks are flared outward as shown in the drawings to provide a line receiving space which is preferably substantially V-shaped in cross section. The outer ends of the disks are turned toward each other to provide flanges 34 with an annular space 36 between them through which the line may extend. The central parts of the disks 32 are supported by a pair of backing plates 37.

A ratchet 39 is pressed on the shaft on one side and a collar 38 may be pressed on the shaft 23 on the other side or may be integral therewith. The collar 38 and ratchet 39 hold the backing plates 37 in position. It will be understood that the shaft 23, the collar 38, the ratchet 39 and the backing plates 37 and disks 32 are removable from the casing or housing as a unit and rotate as a unit when the shaft 23 is rotated. The parts may be splined as indicated at 40 to provide a more positive drive if desired.

The ratchet wheel 39 constitutes part of a ratchet assembly conventional in fishing reels. The pawl of the ratchet assembly is shown in dotted lines at 41 (Fig. 2). The housing is slotted as indicated at 42 and the end of the pawl is pivoted to a finger piece 43 on the exterior of the housing. A spring element 44 on the internal wall of the housing section 17 has an opening at 46 through which the ratchet pawl 41 may be extended or retracted.

The spring 44 serves to hold the ratchet pawl 41 either in its inner or outer position as determined by the location of the finger piece. As is well known in the art, when the ratchet pawl is in a position to engage the ratchet wheel 39, rotation of the spool or drum 11 is under the control of the ratchet assembly. When the ratchet pawl is retracted, the spool may rotate freely so that the line may be payed out in making a cast with a minimum of resistance to rotation of the spool.

Mounted on the shaft 23 is a friction collar 46 which may be of leather. A spring 47 is secured as shown at 48 to the inner wall of the housing section 13. In the conventional manner common in fishing reels, the spring may be pressed inward to engage the friction collar 46 by a finger piece 49. For this purpose a grommet 51 is carried by the margins of an opening in the housing section 13 and the extended end 52 of the finger piece 49 threads into the grommet and may be shifted into engagement with the spring. By this means, the resistance to rotation of the spool or drum may be adjusted so as to control, within limits, the length of the cast.

Of particular importance in the fishing reel of my invention as shown most clearly in Fig. 4 is the fact that the flanges 34 are turned outward slightly as shown at 56. Further, the outer ends of the flanges are sharply curved outwardly, as shown at 57, so as to provide a minimum of space 58 between the rotary spool and the flange 18 of the housing section 17. By turning the outer periphery 57 of the flanges 34 sharply outward, it is possible to grind the outer peripheries of these flanges so that a minimum of clearance is maintained between the ends of the flanges and the internal wall of the housing. It will be understood that in operating a reel, the line occasionally becomes snagged or caught between adjacent moving and stationary parts. With the construction shown, it is substantially impossible for the line to become caught between the inner wall of the housing and the outer edges of the flanges 54.

A further fact of particular importance is that the winding space for the line decreases by reason of the V-shaped cross section of the spool from the outer periphery toward the center of the spool which I have found in practice causes the line to wind more tightly on the spool as the line is being reeled in. The slanting side walls of the line receiving space cause the line naturally to seek the lowest level because each of the outer turns of the line as it is wound on the spool tends to slide down the inclined walls. The line may be extended through either of a pair of openings 61 and 62, the line being extended through one of the openings for a right-handed person and through the other of said openings for a left-handed person.

A pair of elongated slots 63 and 64 which are elongated in the direction of the periphery of the housing are provided. These elongated openings are preferably formed in the flanged part 18 of the housing section 17 and are preferably in alignment with one of the flanges 34 of the spool. By means of these openings, the thumb may be applied to the spool or drum for the purpose of, for example interrupting the rotation of the spool as the line is payed out in case it is desired to shorten the length of the cast. One of the elongated openings is for use by a left-handed person and the other by a right-handed person.

In Figs. 7 and 8 I have shown a modification of the elongated openings 63 and 64 for enabling thumbing of the spool or drum. In this modification, two or more small sets of openings 66 and 67 are provided which are provided for the same purpose as the openings 63 and 64. The advantages of small openings of Figs. 7 and 8 is that bridging parts 68 are formed which prevent a strand of the line from getting through the opening and becoming snagged. With the arrangement of a series of openings as shown at 66 and 67 with the bridging parts 68, the thumbing openings may be placed centrally of the two spool flanged sections so that both sections may be thumbed simultaneously. With the arrangement of elongated slots as shown in Fig. 6 at 63 and 64, the slots should be placed in alignment with only one of the flanges and the inner edges of the slots should at least not be beyond the edge 57 of the flange as shown at 69 (Fig. 4); otherwise the line is likely to become snagged.

While I have shown and described the preferred reel of my invention, it will be apparent that various changes and modifications may be made therein, particularly in the form and relation of parts without departing from the spirit of my invention, as set forth in the appended claims.

I claim:

1. A fishing reel comprising, in combination, a reel spool having a pair of peripheral flanges extending toward each other with the edges of said flanges being spaced apart a distance sufficient to permit the line to freely pass therethrough, a housing completely enclosing the spool, means extending through the housing for rotating the spool, said housing having a pair of openings through which the line may extend, one of said openings being for a right-handed user and the other being for a left-handed user, said flanges being spaced from the internal wall of the housing a distance substantially less than the thickness of the line and said housing having a pair of opening means elongated peripherally of the housing, each of said opening means being in registry with one of the flanges of the spool whereby the thumb of the user may be applied to the spool for controlling its rotation.

2. A fishing reel in accordance with claim 1 wherein the spool comprises a pair of approximately disc shaped elements contiguous to each other adjacent their central portions and flaring outwardly from the central portions to the flanges to form a line receiving space which increases in cross-sectional area toward the flanges.

References Cited in the file of this patent

UNITED STATES PATENTS

| Number | Name | Date |
| --- | --- | --- |
| 55,653 | Hatch | June 19, 1866 |
| 1,507,638 | Verhey | Sept. 9, 1924 |
| 1,996,697 | Cumings | Apr. 2, 1935 |
| 2,026,665 | Beasley | Jan. 7, 1936 |
| 2,523,827 | Holm | Sept. 26, 1950 |

FOREIGN PATENTS

| Number | Country | Date |
| --- | --- | --- |
| 2,793 | Great Britain | Nov. 10, 1910 |